(12) United States Patent
Sutherland et al.

(10) Patent No.: US 7,428,586 B2
(45) Date of Patent: Sep. 23, 2008

(54) SYSTEM AND METHOD FOR DISCOVERING UNDISCOVERED NODES USING A REGISTRY BIT IN A POINT-TO-MULTIPOINT NETWORK

(75) Inventors: David Sutherland, Gourock (GB); Robert Muir, East Kilbride (GB)

(73) Assignee: Intel Corporation, Santa Clara, CA (US)

( * ) Notice: Subject to any disclaimer, the term of this patent is extended or adjusted under 35 U.S.C. 154(b) by 1565 days.

(21) Appl. No.: 10/097,027

(22) Filed: Mar. 12, 2002

(65) Prior Publication Data

US 2003/0177215 A1    Sep. 18, 2003

(51) Int. Cl.
G06F 15/16    (2006.01)
G06F 15/173    (2006.01)

(52) U.S. Cl. .................. 709/224; 709/234; 709/236; 709/242; 709/244

(58) Field of Classification Search .......... 709/230, 709/234, 235, 236, 240, 224, 242, 244; 370/342, 370/355, 395.43
See application file for complete search history.

(56) References Cited

U.S. PATENT DOCUMENTS

| | | | |
|---|---|---|---|
| 6,026,075 A * | 2/2000 | Linville et al. | 370/236 |
| 6,047,330 A * | 4/2000 | Stracke, Jr. | 709/238 |
| 6,052,727 A * | 4/2000 | Kamalanathan | 709/224 |
| 6,085,243 A * | 7/2000 | Fletcher et al. | 709/224 |
| 6,098,103 A * | 8/2000 | Dreyer et al. | 709/234 |
| 6,114,968 A * | 9/2000 | Ramakrishnan et al. | 340/3.51 |
| 6,170,022 B1 * | 1/2001 | Linville et al. | 710/29 |
| 6,405,262 B1 | 6/2002 | Vogel et al. | |
| 6,456,590 B1 * | 9/2002 | Ren et al. | 370/229 |
| 6,556,541 B1 * | 4/2003 | Bare | 370/235 |
| 6,574,664 B1 * | 6/2003 | Liu et al. | 709/224 |
| 6,636,499 B1 * | 10/2003 | Dowling | 370/338 |
| 6,870,836 B1 * | 3/2005 | Dyke et al. | 370/355 |
| 6,957,269 B2 * | 10/2005 | Williams et al. | 709/235 |
| 6,961,334 B1 | 11/2005 | Kaczmarczyk | |
| 2002/0116529 A1 | 8/2002 | Hayden | |
| 2002/0120672 A1 * | 8/2002 | Butt et al. | 709/202 |
| 2002/0196801 A1 * | 12/2002 | Haran et al. | 370/432 |
| 2003/0048801 A1 * | 3/2003 | Sala et al. | 370/445 |
| 2003/0097425 A1 * | 5/2003 | Chen | 709/220 |
| 2003/0133460 A1 * | 7/2003 | Lee et al. | 370/395.43 |

OTHER PUBLICATIONS

Edward Beili, Ethernet PON (EPON) Protocol, Mar. 12, 2001, http://grouper.ieee.org/groups/802/3/efm/public/mar01/beili_1_0301.pdf.*

(Continued)

*Primary Examiner*—Quang N. Nguyen
(74) *Attorney, Agent, or Firm*—Kacvinsky LLC (57) ABSTRACT

Various embodiments and techniques are described for discovery in a network, and for automatically discovering one or more nodes of the network. In an embodiment a discovery loop may be implemented to detect new nodes that may have been added to the network. The data transmission from the nodes may be paused, and undiscovered nodes may be requested to identify themselves. Each node that identifies itself may then be configured by, for example, having a time slot assigned for data transmission from the node. Separate time slots may be assigned to allow multiple nodes to transmit data over certain types of networks without colliding with each other. Data transmission from the nodes may then be resumed.

16 Claims, 6 Drawing Sheets

OTHER PUBLICATIONS

"Ethernet Technologies," Interworking Technologies Handbook, Chapter 7, pp. 7-1-7-40, Ref. # 1-58705-001-3.

"Gigabit Ethernet—Appendix 31C-PAUSE Frame Format," Sep. 1997, pp. 1-3, http://www.iol.unh.edu/testsuites/ge/fc/appendix31C.html.

G. Malkin, "RIP Version 2," Bay Networks, Request for Comments: 2453, Nov. 1998, pp. 1-30, http://www.cis.ohio-state.edu/cgi-bin/rfc/rfc2453.html.

* cited by examiner

SYSTEM AND METHOD FOR DISCOVERING UNDISCOVERED NODES USING A REGISTRY BIT IN A POINT-TO-MULTIPOINT NETWORK

BACKGROUND

To allow communication between the various nodes of a network, the address of a node should be discoverable when a new node is added to the network. Unfortunately, in some networks, the discovery and identification of new nodes is a tedious manual process. For example, in some types of networks, each user must call the service provider and provide the MAC address for their user equipment and wait for the address to be registered before they can begin use.

In addition, in some types of networks, such as point-to-multipoint networks, there exists the possibility that two or more nodes or users may transmit at the same time, creating a collision of data signals on the network. A point-to-multipoint network may be a network where a node or device is able to directly communicate with two or more other nodes or devices. A problem arises in some networks because one or more nodes may be unable to detect such a collision.

Therefore a need exists to provide an improved discovery process, and to detect and resolve possible data collisions that can occur in some types of networks.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

The following represents brief descriptions of the drawings, wherein.

DETAILED DESCRIPTION

In the following detailed description, numerous specific details are set forth in order to provide a thorough understanding of the embodiments of the invention. It will be understood by those skilled in the art, however, that embodiments of the invention may be practiced without these specific details. In other instances, well-known methods, procedures, components and circuits have not been described in detail so as not to obscure the foregoing embodiments of the invention.

It is worthy to note that any reference in the specification to "one embodiment" or "an embodiment" means in this context that a particular feature, structure, or characteristic described in connection with the embodiment may be included in at least one embodiment of the invention. The appearances of the phrase "in one embodiment" or "an embodiment" in various places in the specification do not necessarily refer to the same embodiment, but may be referring to different embodiments.

A network typically comprises a number of nodes interconnected by a communications medium. The nodes may be capable of communicating information to other nodes over the communications medium using one or more protocols. As used herein, a node may include any device capable of communicating information, such as a computer, server, switch, router, bridge, gateway, optical network unit, customer premises equipment, headend, optical line terminal, and so forth. A node may include, for example, a processor, memory, input/output, and software for execution by the processor. Software may include a series of computer instructions or programs for execution by a processor or node which are stored in memory or other storage medium.

A communications medium may be any medium capable of carrying information signals, such as twisted-pair wire, coaxial cable, fiber optics, radio frequencies and so forth. A protocol may comprise a set of rules by which the information signals are communicated over a communications medium. For example, the protocol might be a packet switching protocol such as the Transmission Control Protocol (TCP) as defined by the Internet Engineering Task Force (IETF) standard 7, Request For Comment (RFC) 793, adopted in September, 1981 ("TCP Specification"), and the Internet Protocol (IP) as defined by the IETF standard 5, RFC 791 ("IP Specification"), adopted in September, 1981, both available from "www.ietf.org" (collectively referred to as the "TCP/IP Specification").

Currently, in certain types of networks, an address of a node must be manually provided to the service provider before the node can begin communicating. An address may be, for example, an alpha-numerical value that uniquely identifies a node. To manually provide an address for a node, a user or technician typically is required to call the service provider to report the address of the user's node or equipment. This is a slow manual process.

Embodiments of the invention may be directed to automatically discovering one or more nodes of a network. According to one embodiment, a discovery loop may be implemented to detect new nodes that may have been added to the network. According to an embodiment, the data transmission from network nodes may be paused, and undiscovered nodes may be requested to identify themselves. Undiscovered nodes may then identify themselves, such as by providing their address. Each node that identifies itself may then be configured. Configuration may include, for example, assigning a time slot for data transmission from the node. Separate time slots may be assigned to allow multiple nodes to transmit data over certain types of networks without colliding with each other. Data transmission from the network nodes may then be resumed. This allows nodes on a network to be automatically discovered.

A data collision may occur in some networks when two nodes transmit at the same time. This may be a particular problem where two undiscovered nodes attempt to identify themselves at the same time, since the undiscovered nodes may not have been assigned a time slot yet. In certain types of networks, such as certain point-to-multipoint networks, some nodes may be unable to detect such a collision.

Therefore, according to one embodiment, one or more undiscovered nodes may identify themselves after waiting a random period of time. By waiting a random period of time, the probability of a data collision may be reduced. In yet another embodiment, a separate node may sense the network to determine whether a collision has occurred. If a collision is detected, the network nodes may be notified of the collision. The undiscovered nodes may then identify themselves again after waiting a random period of time.

Figure 1:
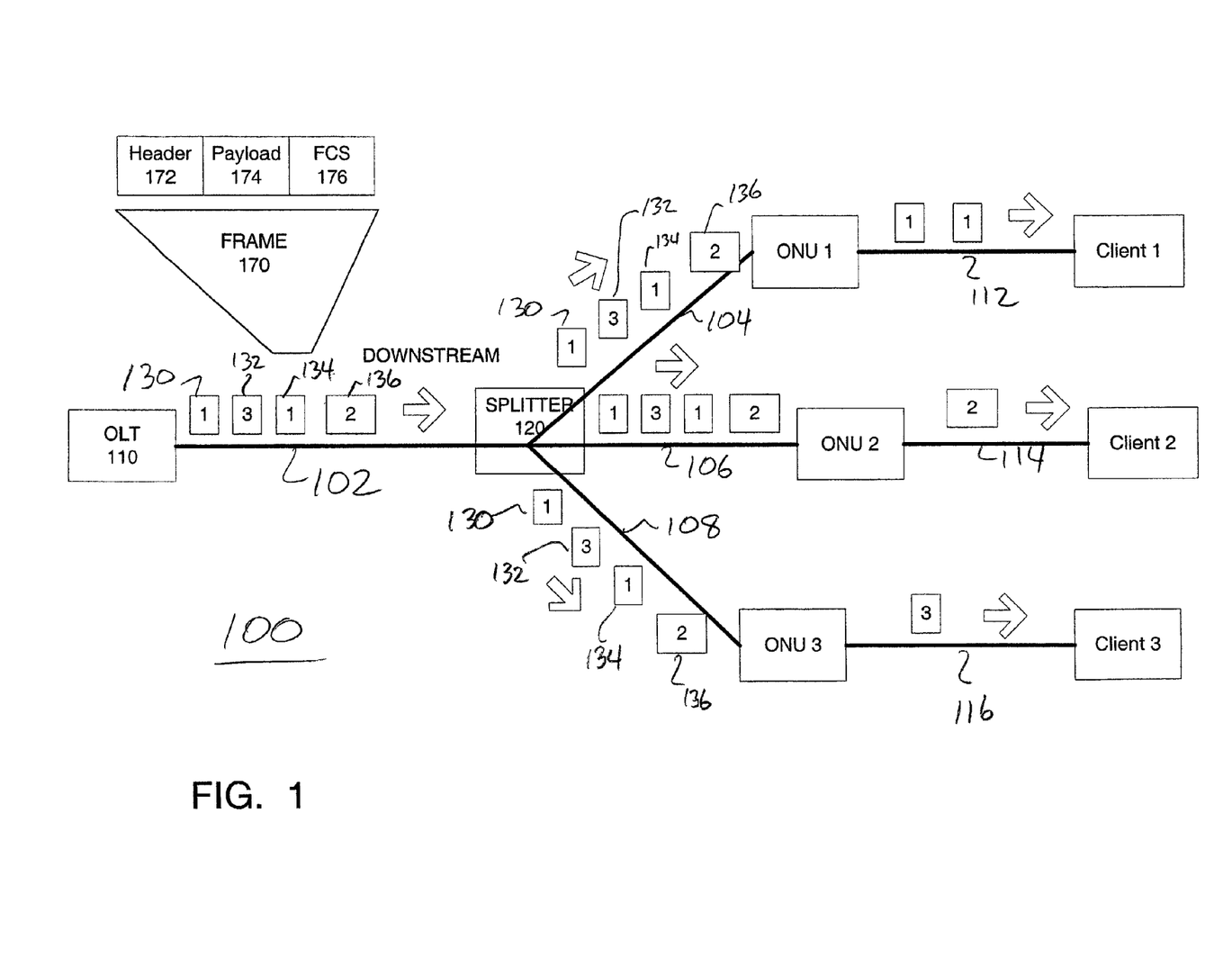
FIG. 1 is a block diagram of a network according to an example embodiment illustrating the flow of data in a downstream direction.

Referring to the Figures in which like numerals indicate like elements, FIG. 1 is a block diagram of a network according to an example embodiment illustrating the flow of data in a downstream direction. A network 100 includes an optical line terminal (OLT) 110 that is connected to an optical splitter 120 via a fiber optic cable 102. OLT 110 transmits and receives data, and may perform some network administration and management functions. OLT 110 is sometimes referred to as a head-end, a central office equipment, or point-of-presence. Optical splitter 120 may also be referred to as an optical coupler or splitter since splitter 120 performs both an optical splitting and optical coupling function, depending on the direction of data flow. Although only one OLT and one splitter are shown, network 100 could include many OLTs and many optical splitters, depending on the network configuration.

Network 100 also includes several optical network units (ONUs), including ONU 1, ONU 2 and ONU 3 connected to splitter 120 via fiber optic cables 104, 106 and 108, respectively. The ONUs are also commonly referred to as subscriber terminals or customer premises equipment (CPE). A client is connected to each ONU. A client may be a computer, a software program running on a computer or other user of data or source of data. Client 1, client 2 and client 3 are connected to ONU 1, ONU 2 and ONU 3 via lines 112, 114 and 116, respectively. Although only three ONUs and three clients are shown in network 100, any number of ONUs and clients may be provided.

According to an example embodiment, OLT 110 may operate as an interface between a service provider's core network (not shown) and network 100, converting data between the optical format for use on network 100 and a format for use on the service provider's core network. OLT 110 may transmits data to ONUs and may receive data from ONUs in network 100. Although not shown, OLT 110 may include logic, such as media access control (MAC) logic to access the network 100 (including cable 102) and an optical transceiver (transmitter/receiver) logic for transmitting and receiving data on cable 102.

Likewise, according to one embodiment, each ONU may provide an interface between network 100 and the client or another network (such as a Local Area Network, etc.). Each ONU may communicate data between OLT 110 over network 100. ONUs may receive data in an optical format and convert the data to the customer's desired format (e.g., Ethernet, T1), and may convert data from the customer's format to the optical format for transmission over network 100, according to one embodiment. Thus, each ONU may convert signals between optical and electrical forms. Each ONU may include a media access control (MAC) logic and optical transceiver logic (not shown). Each ONU may have an address, such as a MAC address. According to an embodiment, packets or frames transmitted from OLT 110 may be selected by the ONU for processing by the associated client if the destination address of the frame matches the address of the ONU.

According to an example embodiment, network 100 may be a Passive Optical Network (PON), where one or more connections between components or nodes may be made using fiber optic cables, optical splitters and other passive components. Passive components may comprise components which do not pass nor require electrical power. PONs are being considered to address the segment of the communications infrastructure between the service provider's central office or head-end and business or residential customer's locations.

A PON is usually, for example, a high bandwidth point-to-multipoint (P2MP) optical fiber network based on one or more protocols, formats or standards. These standards may include, for example: Institute of Electrical and Electronics Engineers (IEEE) Std. 802.3, 2000 Edition, Carrier Sense Multiple Access with Collision Detection (CSMA/CD) Access Method and Physical Layer Specifications ("802.3 Ethernet specifications"), Time Division Multiplexing (TDM), ATM User-Network Interface Specification V. 3.1, 1994 ("ATM specifications"), etc. For example, a PON that sends and receives 802.3 Ethernet frames between nodes or devices may be referred to as an Ethernet PON (EPON). A point-to-multipoint network may include a network where a device (such as the OLT 110) may be able to directly communicate with two or more other nodes (such as the ONUs).

Network 100 is an example of a point-to-multipoint network. The tree structure of network 100 may allow OLT 110 to directly communicate with all (or many) of the ONUs (e.g., ONU 1, ONU 2 and ONU 3). Also, signals or frames sent from one ONU to OLT 110 may not be received by the other ONUs, but may be received only by the OLT 110.

Referring to FIG. 1, according to an example embodiment, network 100 may be an Ethernet Passive optical Network (EPON). OLT sends Ethernet frames, for example, to one or more ONUs, and receives Ethernet frames from the ONUs. According to an embodiment, the flow of frames from the OLT 110 to ONUs may be referred to as the downstream direction, and the flow of frames from ONUs to OLT 110 may be referred to as the upstream direction. Each Ethernet frame 170 may include a header 172 (including source and destination MAC addresses), a payload 174 and a frame check sequence (FCS) that may be used for error detection. OLT 110 may send variable length Ethernet frames that are specifically addressed to each of the ONUs, including frames 130 and 134 addressed to ONU 1, frame 132 addressed to ONU 3 and frame 136 addressed to ONU 2, as indicated by the numbers inside each frame shown in FIG. 1. An Ethernet frame is addressed to a specific ONU by using a destination MAC address in header 172 that matches the ONU's MAC address.

At the splitter 120, the traffic (e.g., Ethernet frames) is divided into three separate signals for cables 104, 106 and 108, each carrying all of the frames from the OLT 110. For example, as shown in FIG. 1, splitter 120 splits the received optical signals from OLT 110 to effectively generate (since it is the same signal) copies of frames 130, 132, 134 and 136 onto each of cables 104, 106 and 108. When the frames reach the ONUs, each ONU accepts frames intended for it (or addressed to it) and discards the frames not addressed to it. Each ONU then sends or passes the selected frames to the corresponding client for processing. There is typically no problem with data collisions in the downstream direction since there is only one data source (OLT 110), in this embodiment.

Figure 2:
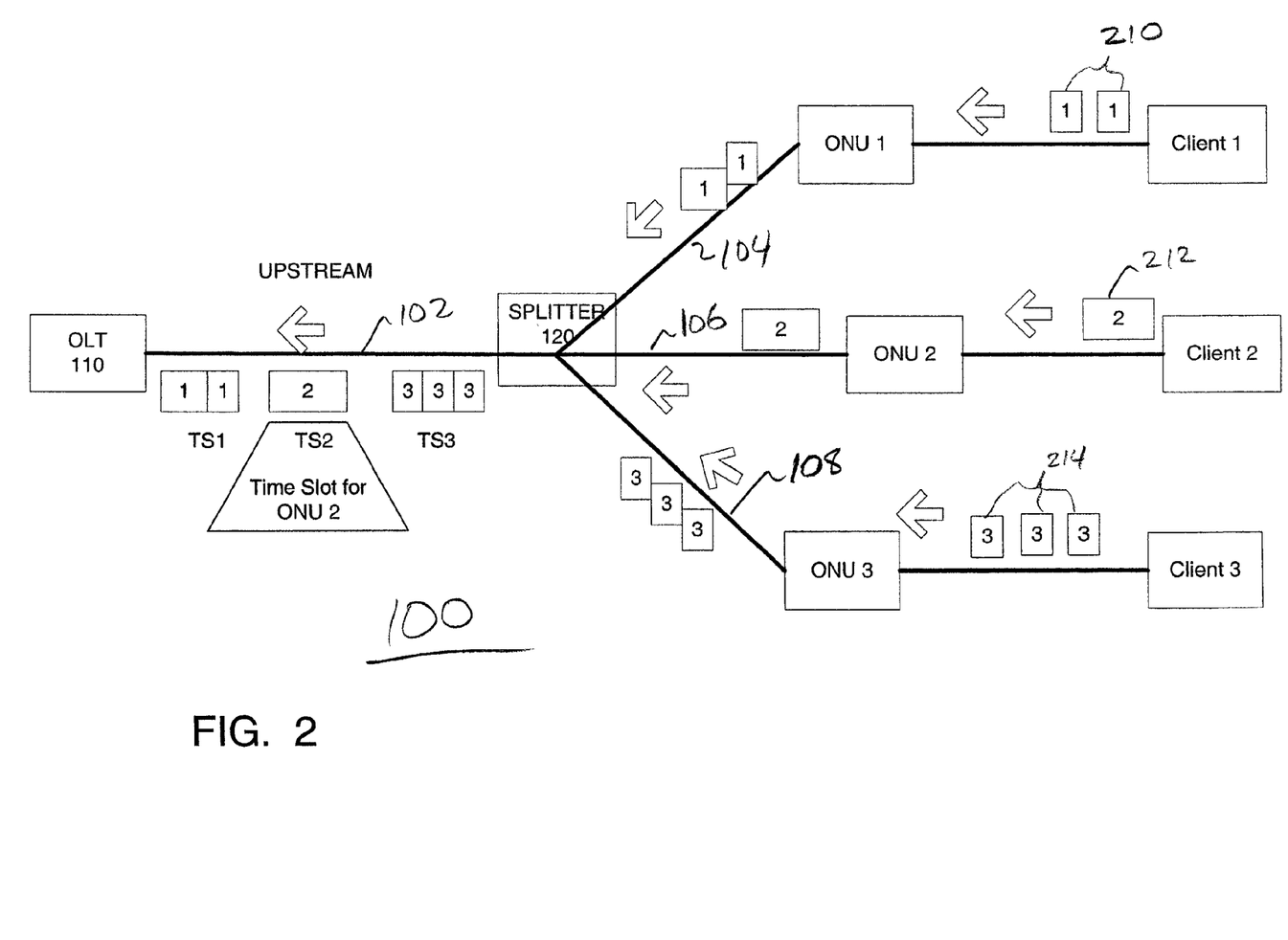
FIG. 2 is a block diagram of the network shown in FIG. 1 according to an example embodiment illustrating the flow of data in an upstream direction.

FIG. 2 is a block diagram of the network shown in FIG. 1 according to an example embodiment illustrating the flow of data in an upstream direction.

According to an example embodiment, different fiber optic cables may be used to allow transmission in each direction (upstream and downstream) at the same time (i.e., full duplex). According to another embodiment, different channels over one cable (e.g., cable 102) may be used for upstream and downstream traffic. For example, different optical wavelengths or different Time Division Multiplexed time slots may be used for upstream and downstream traffic.

According to an example embodiment shown in FIG. 2, different wavelengths are used for upstream and downstream traffic. This allows upstream and downstream traffic to share the same fiber optic cable (e.g., cable 102). In addition, because many ONUs may transmit to OLT 110 in the upstream direction, Time Division Multiplexed time slots are assigned for each ONU to transmit to OLT 110 to prevent a collision, according to an example embodiment. The time slots are synchronized so that upstream frames from different ONUs do not interfere or collide with each other once the data is coupled onto common fiber optic cable 102 (or common fiber). For example, as shown in FIG. 2, client 1 generates two frames 210, which ONU 1 transmits upstream during time slot 1 (TS1), which is the time slot assigned to ONU 1; client 2 generates one frame 212 which ONU 2 transmits upstream during time slot 2 (TS2), which is the time slot assigned to ONU 2; and client 3 generates three frames 214 which ONU 3 transmits during time slot 3 (TS3). In this example, there are three non-overlapping time slots assigned to the three ONUs, respectively. A time slot is typically assigned to each ONU. Also, as shown in FIG. 2, the frames or signals transmitted from ONU 1, ONU 2 and ONU 3 upstream are coupled or combined by splitter 120 from three separate fibers or cables (104, 106, 108) onto a single fiber or cable 102.

Currently, in a cable modem network, the MAC address is typically manually provided to the service provider. To accomplish this, the user or technician typically calls the service provider to report the MAC address of the user's cable modem.

According to an example embodiment, an automatic discovery technique is provided where a line terminal (such as OLT 110) may automatically discover the MAC address of any undiscovered (or unregistered) nodes (such as ONUs).

Figure 3:
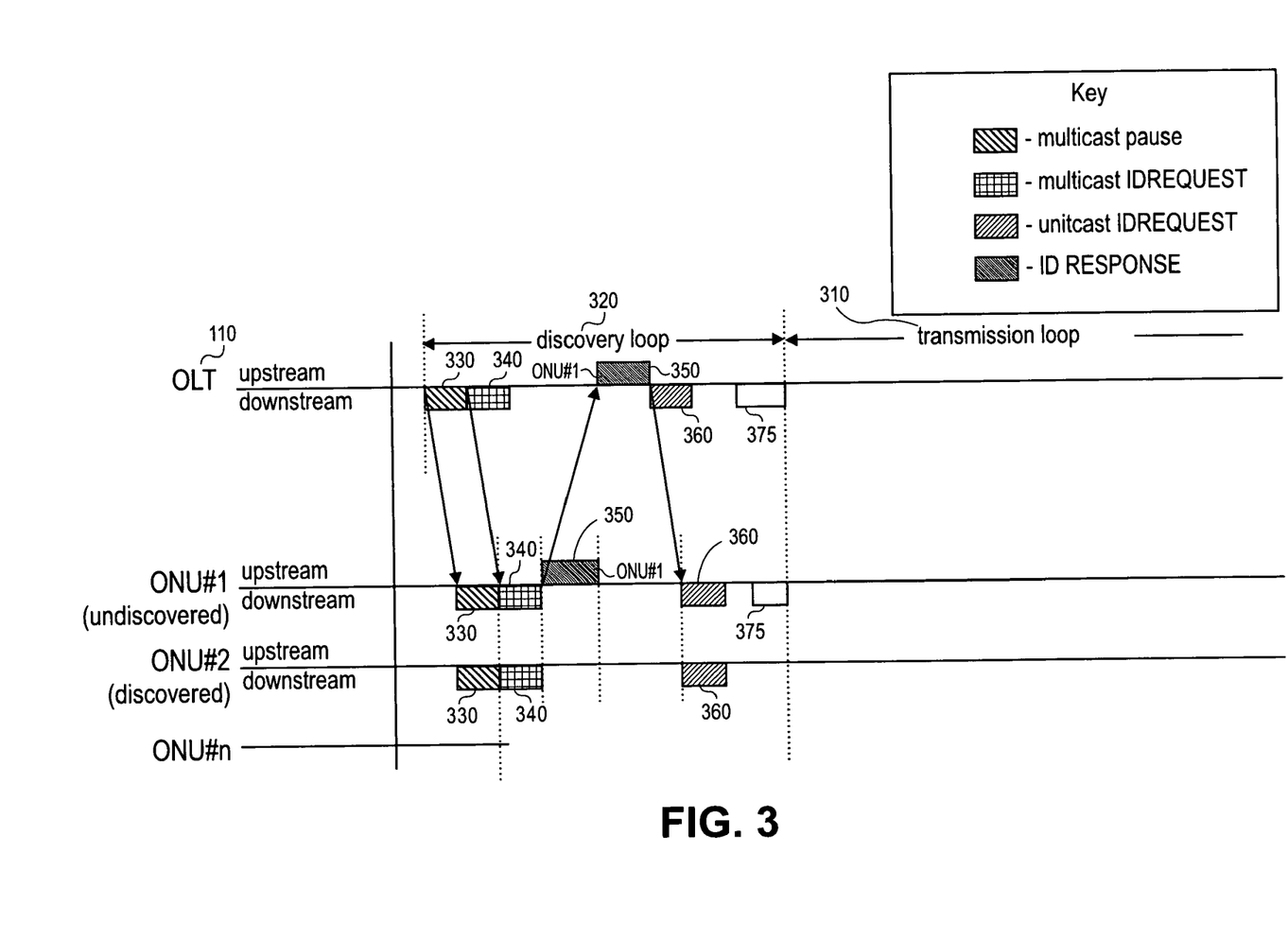
FIG. 3 is a timing diagram illustrating operation of a discovery technique according to an example embodiment.

FIG. 3 is a timing diagram illustrating operation of a discovery technique according to an example embodiment. Referring to FIG. 3, an OLT 110 is shown, along with ONU 1 and ONU 2. In this example, it is assumed that ONU 1 is undiscovered by OLT 110 (i.e., MAC address of ONU 1 is unknown to OLT 110), and OLT 110 already knows the MAC address of ONU 2. ONU 1 may be undiscovered because it may have just been added or connected to the network, for example. During normal operation, the network 100 (FIGS. 1 and 2) may operate in a data transmission loop 310 where ONUs are allowed to transmit data to OLT 110 and OLT 110 may transmit data to one or more ONUs. According to one embodiment, network 100 may periodically enter a discovery loop 320 in which OLT 110 may attempt to discover new ONUs.

The discovery loop 320 may be manually initiated (e.g., triggered by a network administrator) or automatically initiated by a computer or software program. For example, the network administrator may have been alerted by Email, telephone or other media that the network is being reconfigured or one or more ONUs have been added, etc. The network administrator may then initiate the discovery loop 320 to allow OLT 110 to discover the MAC addresses of any new ONUs, or to discover any existing ONUs where their MAC addresses may have changed or been reprogrammed. Alternatively, a computer program may automatically initiate the discovery loop, for example, when a network management computer or OLT 110 detects a predetermined event. For example, OLT 110 may be electronically notified of a change in the network or addition of a new ONU, causing the OLT 110 to initiate the discovery loop 320. The discovery loop may also be automatically initiated at regular times or intervals, or at specified times. As an example, the overhead associated with the discovery loop may be assigned a maximum percentage of network bandwidth or resources, and the discovery loop may be run automatically at intervals so as to use no more than the resources or bandwidth allocated for discovery.

Figure 6:
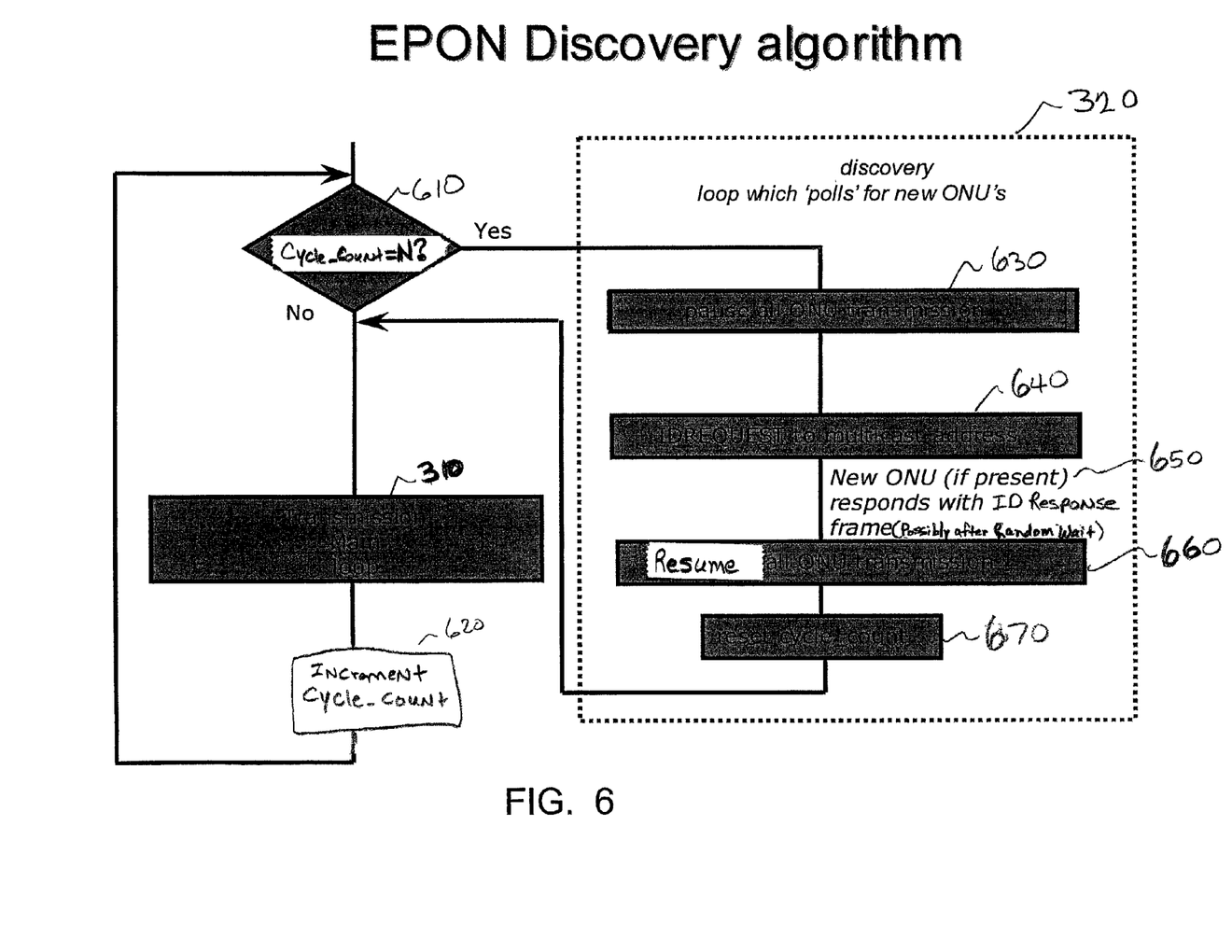
FIG. 6 is a flow chart illustrating operation of a discovery technique according to an example embodiment.

FIG. 6 is a flow chart illustrating operation of a discovery technique according to an example embodiment. Referring to FIGS. 3 and 6, according to an example embodiment, OLT 110 may maintain a counter (cycle_count) that counts the number of times the transmission loop 310 is performed. The transmission loop 310 (FIGS. 3, 6) may involve, for example, allowing ONUs to transmit data to OLT 110 for a specific period of time (e.g., 5 milliseconds). Cycle_count may be initialized to 0 for example. At 610 in FIG. 6, OLT 110 determines whether cycle_count is equal to a predetermined value (N). The predetermined value (N) may be set, for example, by a network administrator. If cycle_count does not equal N, then the transmission loop 310 may be entered. For example, in transmission loop 310, ONUs may be allowed to transmit data for a predetermined period of time. Cycle_count is incremented at 620, and a comparison is made again at 610. This process repeats until cycle_count eventually is equal to N. When cycle_count becomes equal to N, then control passes to discovery loop 320. This allows the discovery loop 320 to be run occasionally without burdening the network.

Referring to FIGS. 3 and 6, an operation of the discovery loop will be explained according to a first embodiment. At 630 in FIG. 6, OLT 110 pauses the transmission of non-control (e.g., data) traffic from the ONUs. This pause may be used to reduce or eliminate the upstream non-control traffic and thereby reduce the probability of a collision when one or more undiscovered ONUs send ID response messages (described below). ONUs may be paused, for example, by OLT 110 sending a multicast pause message 330 downstream that causes the ONUs to stop upstream data transmission for a specified time period. A multicast message is a message sent to multiple nodes.

Next, at 640 (FIG. 6), OLT 110 requests any undiscovered ONUs to identify themselves. This may be done, for example, by OLT 110 transmitting or sending a multicast identification request (ID request) message 340 (FIG. 3) to one or more of the ONUs.

At 650 in FIG. 6, if there are one or more ONUs that are undiscovered by OLT 110, the undiscovered ONUs identify themselves to OLT 110, in response to the ID request message 340. Each ONU may store, for example, a registry bit that indicates whether or not OLT 110 has discovered the ONU. This registry bit is initially cleared when a device or ONU is added or the network is reconfigured. Thus, according to an example embodiment, only those ONUs having a registry bit that is cleared (indicating that it has not yet been discovered) should identify themselves to OLT 110 in response to the ID request message 340.

Each undiscovered ONU may identify itself, for example, by sending a unicast identification response (ID response) message 350 upstream to OLT 110. A unicast message is sent to or addressed to one receiver or node (to OLT 110 in this case). According to an example embodiment, the identification response message 350 may identify the MAC address of the responding ONU. OLT 110 then stores or records the MAC address of the responding ONU. OLT 110 may also assign a time slot to the responding ONU for upstream transmission.

In response to receiving each ID response message 350, OLT 110 may send a unicast acknowledgement 360 to each responding ONU. Acknowledgement 360 may be provided, for example, as a unicast ID request message, containing the MAC address of the responding ONU in the destination MAC address field of the frame. The responding ONU receives the acknowledgement 360 and then sets its registry bit to indicate that OLT 110 has discovered it. Setting the registry bit will prevent the ONU from responding to future ID request messages. If an acknowledgement message 360 is not received within a predetermined time period, the undiscovered ONU may send a subsequent ID response message or messages to OLT 110.

The acknowledgement 360 may also notify the ONU of the time slot that has been assigned to it. The acknowledgement 360 (and/or subsequent messages) may also be used to exchange information between OLT 110 and the ONU regarding options, features or capabilities.

At 660 in FIG. 6, OLT 110 resumes data transmission from the ONUs. This may be performed, for example, by OLT 110 sending a resume message. An example of a resume message may be a multicast pause message 375 (FIG. 3) with the time period for pausing set to zero, which means no pause. Thus, message 375 may notify the ONUs that they may immediately resume transmitting data (non-control) messages upstream to OLT 110. Thus, pause message 330 operates to pause upstream data transmission from the ONUs, while message 375 un-pauses or resumes ONU data transmission (FIG. 3).

At 670 in FIG. 6, cycle_count is reset or cleared (e.g., cleared to zero), and control passes again to the transmission loop 310 (FIGS. 3 and 6).

If two ONUs (for example ONU 1 and ONU 2) transmit at the same time to OLT 110. Consequently, their signals may collide when these signals reach the common cable 102. According to an example embodiment, once OLT 110 has discovered an ONU, the ONU may transmit frames upstream during its assigned time slot, thereby preventing an upstream collision. Two or more undiscovered ONUs may receive the ID request message 340 and respond at the same time with respective ID response messages 350. This may create a collision on cable 102 because time slots have not yet been assigned to undiscovered ONUs, according to one embodiment. Unfortunately, due to the separate cables 104, 106 and 108 (FIGS. 1 and 2) for ONU 1, ONU 2 and ONU 3, the ONUs may be unable to detect the collision on cable 102 between the ID response messages 350 sent by two or more ONUs. This may be different from a traditional 802.3 Ethernet network where nodes may be able to sense or detect a collision using Carrier Sense Multiple Access/Collision Detection (CSMA/CD). In some point-to-multipoint networks (such as that shown in FIGS. 1 and 2), some nodes may be unable to detect signal collisions. As a result, a technique is needed for detecting and handling such collisions.

Therefore, according to an alternative embodiment, undiscovered ONUs may respond to receipt of the ID request message 340 (FIG. 3) by transmitting an ID response message 350 after a random wait period (not shown in FIG. 3). It is expected that because each undiscovered ONU waits a random period of time after receipt of the ID request message 340 before transmitting an ID response message 350, the probability for a collision will be reduced. Each undiscovered ONU may send out additional ID response messages 350 (e.g., after a random wait) if an acknowledgement from OLT 110 is not received within a predetermined time.

Figure 4:
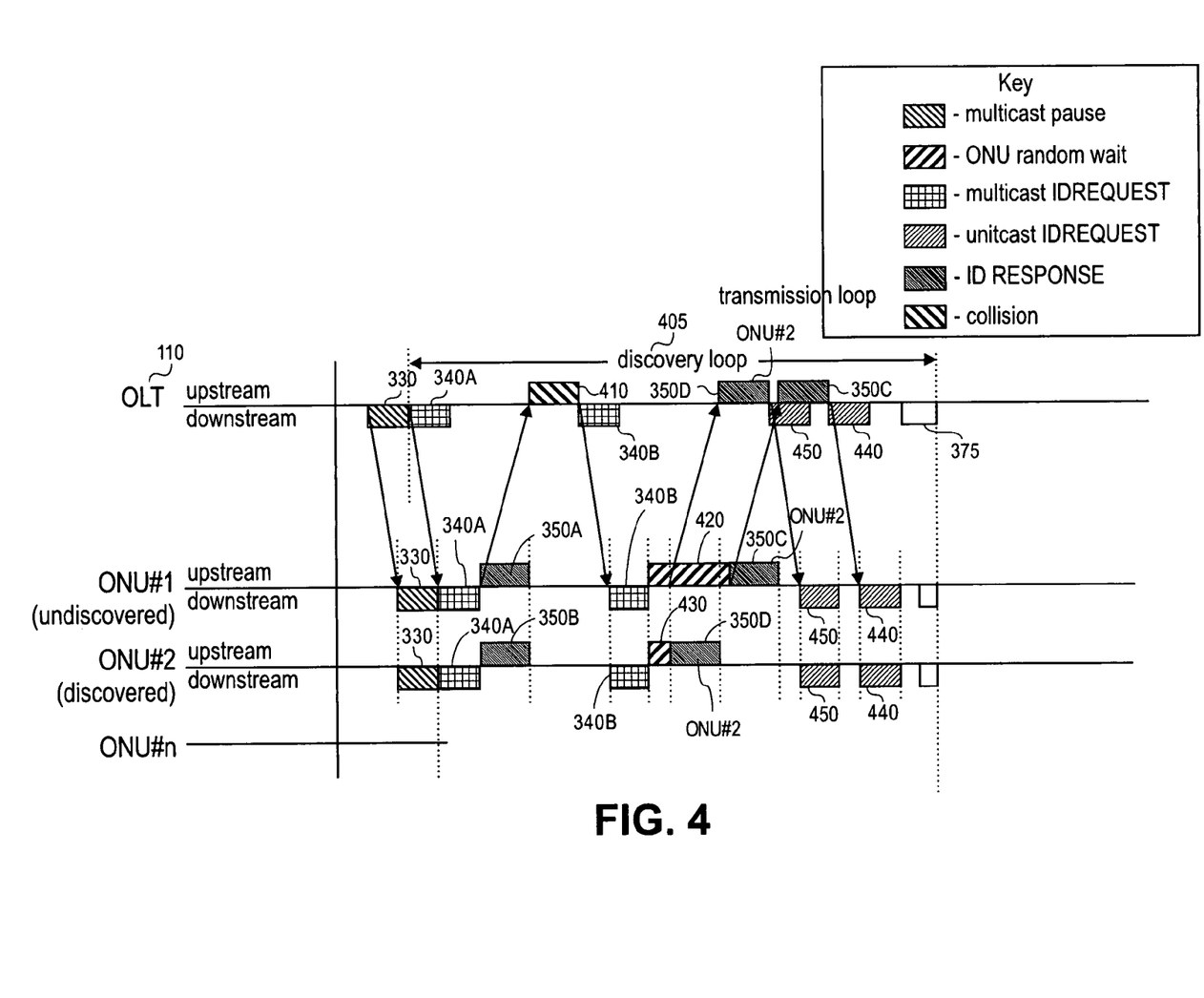
FIG. 4 is a timing diagram illustrating operation of a discovery technique according to another example embodiment.

FIG. 4 is a timing diagram illustrating operation of a discovery technique according to another example embodiment. In the embodiment shown in FIG. 4, an alternative technique is used to handle collisions. In this example, there are two undiscovered ONUs shown, ONU 1 and ONU 2. Referring to FIG. 4, at the beginning of the discovery loop 405, OLT 110 may send a multicast pause message 330 to pause the transmission of non-control frames from the ONUs.

Next, referring to FIG. 4, OLT 110 may send a first multicast ID request message 340A to the ONUs, requesting that any undiscovered ONUs provide their MAC address. In response to the ID response message 340A, undiscovered ONU 1 may transmit an ID response message 350A at the same time that undiscovered ONU 2 transmits an ID response message 350B. In this example, the response messages 350A and 350B therefore may collide with each other on cable 102 (FIGS. 1 and 2), as shown by collision block 410 (FIG. 4). OLT 110 may detect or sense the collision, for example, using CSMA/CD or other technique. ONU 1 and ONU 2, however, are typically unable to detect the collision due to the point-to-multipoint arrangement of network 100, according to one embodiment.

In response to the detected collision 410, OLT 110 transmits a second multicast ID request message 340B to the ONUs. In an example embodiment, the second multicast ID request message 340B may indicate that a collision has occurred or may contain a random back-off request. The random back-off request may request that ONUs respond after a random wait period.

In response to the second multicast ID request message 340B, ONU 1 and ONU 2 may back-off or wait a random time period before sending a second response. ONU 1 may wait a random time period 420 before sending ID response message 350C. ONU 2 may wait a random time period 430 before sending ID response 350D. In this example, because these random wait time periods 420 and 430 are quite different, the ID response messages 350C and 350D probably do not collide. The MAC addresses for each of ONUs 1 and 2 are stored or recorded by OLT 110. OLT 110 then sends unicast acknowledgements 440 and 450 to ONUs 1 and 2, respectively. OLT 110 may also configure the ONUs, such as assigning a time slot to each ONU.

ONU 1 and 2 may each determine that it should wait a random period of time, for example, based on a number of different criteria or conditions. ONU 1 and 2 may wait a random period of time due to the explicit instructions or information in the second ID request message 340B (e.g., indicating that a collision occurred or including a random back-off request), or based on the fact that a second ID request has arrived within a specific time period, or because no acknowledgement was received in response to its original ID response message (350A or 350B).

Finally, referring to FIG. 4, OLT 110 allows the transmission of upstream data traffic to resume, for example, by transmitting a multicast pause message 375 to all ONUs with the time period for pausing set to zero. Thus, by setting time period for pausing to zero, message 375 operates as a resume message. The zero informs the ONUs that they may resume transmission of upstream data.

IEEE 802.3 Ethernet specification describes in annex 31B a pause control frame that may be used for flow control. This pause message according to an example embodiment is used to pause or temporarily stop non-control (data) traffic in point-to-multipoint networks, for example. As shown in Table 1 below, according to an example embodiment, the multicast pause message (such as pause message 330) is implemented using the existing IEEE 802.3 Ethernet pause control frame (or alternatively to be very similar to the existing 802.3 pause control frame), preferably specifying a multicast destination address. The existing pause control frame in IEEE 802.3 also uses a multicast destination address.

In addition, IEEE 802.3 Ethernet specification currently reserves several unused opcodes for future use for MAC control frames. According to an example embodiment, two of these reserved opcodes are used for the ID request message and the ID response message. An advantage of this approach is that the discovery protocol and frame format for pause messages, ID request and ID response messages (e.g., as used and described above) will be compatible with the existing IEEE 802.3 Ethernet protocol. Thus, according to an example embodiment, the pause message may be implemented as an IEEE 802.3 pause MAC control frame, while the ID request message and the ID response message may be implemented as an extension to the existing IEEE 802.3 Ethernet protocol (e.g., using reserved opcodes).

TABLE 1

| Opcode (Hex) | MAC Control Function | Proposed Use in Point-To-Multipoint Networks |
|---|---|---|
| 00-01 | PAUSE (specified in Annex 31B of IEEE 802.3, for flow control in Ethernet networks) | Requests that the recipient stop transmitting non-control (data) frames for a period of time indicated by the parameters of this function |
| 00-02 | ID Request | Requests that the recipient send its MAC address, if not already registered (discovered) |
| 00-03 | ID Response | Response frame containing source MAC address of CPE or ONU, e.g., in response to ID Request |

Figure 5:
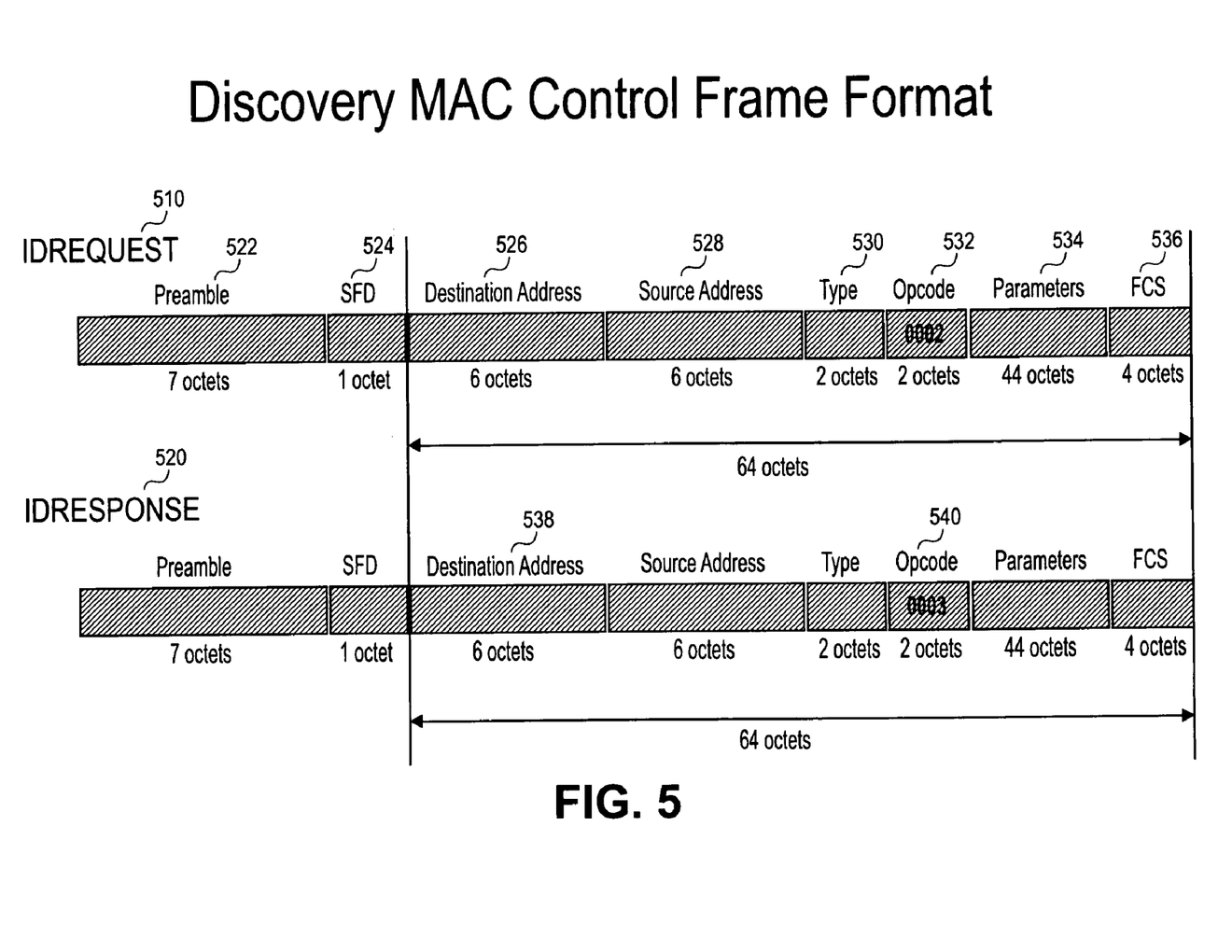
FIG. 5 is a diagram illustrating a format of ID request and ID response messages according to an example embodiment.

FIG. 5 is a diagram illustrating a format of ID request and ID response messages according to an example embodiment. The ID request message 510 is a multicast message and includes a preamble 522, a start frame delimiter (SFD) 524 indicating the start of the frame, a destination MAC address 526, a source MAC address 528, a type 530 indicating the type of frame (in this case, a MAC control frame), an opcode 532 specifying the type of function for the control frame, one or more parameters 534 and a frame check sequence (FCS) 536 for error detection. The Xs in the fields indicate that any valid numerical (e.g., hex) value can be used here. Destination address 526 is preferably a well-known multicast address because the ID request message is preferably sent as a multicast message. An opcode 532 of 0002 specifies that this frame is an ID request message.

ID response message 520 includes the same basic format at message 510. However, ID response message 520 is a unicast message, and thus, address 538 is a unicast address. Also, opcode 540 is 0003, specifying that this control frame is an ID response message.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method of discovery in a network comprising:
pausing data transmission from one or more nodes;
requesting the nodes that are undiscovered to identify themselves to a line terminal;
one or more of the undiscovered nodes identifying themselves to the line terminal after a random wait period and re-identifying themselves to the line terminal after another random wait period if they do not receive an acknowledgement within a predetermined time;
assigning a time slot to each of the nodes that identified themselves; and
resuming data transmission from the one or more nodes by transmitting a pause message with pause time period set to zero from the line terminal to the one or more nodes;
wherein the nodes store a registry bit that indicates which nodes are undiscovered and only those nodes having a cleared registry bit identify themselves to the line terminal.

2. The method of claim 1 wherein said pausing comprises sending a multicast pause message to one or more of the nodes, the multicast pause message being provided as an IEEE 802.3 pause MAC control frame.

3. The method of claim 1 wherein the one or more of the undiscovered nodes identifying themselves after a random wait period comprise the one or more nodes sending an identification response message after a random wait period after said requesting.

4. The method of claim 1 wherein the one or more of the undiscovered nodes identifying themselves after a random wait period comprises:
one or more of the undiscovered nodes identifying themselves to a line terminal;
the line terminal detecting a collision between two or more nodes;
the line terminal notifying one or more of the nodes that a collision occurred; and
one or more of the undiscovered nodes identifying themselves to the line terminal again after a random wait period.

5. The method of claim 4 wherein one or more of the undiscovered nodes identifying themselves comprises one or more of the undiscovered nodes identifying themselves to an optical line terminal.

6. A method of discovery in a point-to-multipoint network comprising:
receiving a pause message from a line terminal at a node to pause data transmission from the node;
receiving an identification request message from the line terminal at the node;
the node sending an identification response message to the line terminal after a random wait period if the node is undiscovered and sending another identification response message to the line terminal after another random wait period if the node does not receive an acknowledgement within a predetermined time; and
receiving another pause message from the line terminal at the node with pause time period set to zero to resume data transmission from the node;
wherein the node stores a registry bit that indicates if it is undiscovered and only a node with a cleared registry bit identifying itself to the line terminal.

7. The method of claim 6 wherein the node sending an identification response message comprises sending an identification response message after waiting a random wait period from receipt the identification request message if the node is undiscovered.

8. The method of claim 6 wherein the node sending an identification response message comprises:
a line terminal detecting that a collision has occurred;
the line terminal then notifying one or more nodes of the collision; and
one or more of the nodes sending another identification response message to the line terminal after a random wait period.

9. A method comprising:
  transmitting data between a line terminal and one or more nodes in a point-to-multipoint network;
  interrupting the transmission of data to perform the following discovery process:
    pausing data transmission from the one or more nodes;
    requesting that one or more of the undiscovered nodes identify themselves to the line terminal;
    the one or more of the undiscovered nodes identifying themselves to the line terminal after a random wait period and re-identifying themselves to the line terminal after another random wait period if they do not receive an acknowledgement within a predetermined time; and
    resuming the transmission of data between the line terminal and the one or more nodes by the line terminal sending a pause message with pause time period set to zero to the one or more nodes;
    wherein the nodes store a registry bit that indicates which nodes are undiscovered and only those nodes having a cleared registry bit identify themselves to the line terminal.

10. The method of claim 9 wherein the discovery process is automatically initiated by a computer or software program.

11. The method of claim 9 wherein the discovery process is automatically initiated by a computer or software program at periodic intervals.

12. The method of claim 9 wherein the discovery process is manually initiated.

13. The method of claim 9 wherein the discovery process is initiated when a change in the network configuration is detected.

14. An article comprising:
  a storage medium;
  said storage medium including instructions stored thereon that, when executed by a processor, result in:
    pausing data transmission from one or more nodes;
    requesting the nodes that are undiscovered to identify themselves to a line terminal;
    one or more of the undiscovered nodes identifying themselves to the line terminal after a random wait period and re-identifying themselves to the line terminal after another random wait period if they do not receive an acknowledgement within a predetermined time;
    assigning a time slot to each of the nodes that identified themselves; and
    resuming data transmission from the one or more nodes by transmitting a pause message with pause time period set to zero from the line terminal to the one or more nodes;
    wherein the nodes store a registry bit that indicates which nodes are undiscovered and only those nodes having a cleared registry bit identify themselves to the line terminal.

15. The article of claim 14 wherein the stored instructions, when executed by a processor, further result in:
  sending a multicast pause message to one or more of the nodes, the multicast pause message being provided as an IEEE 802.3 pause MAC control frame.

16. The article of claim 15, wherein the stored instructions, when executed by a processor, further result in:
  one or more of the undiscovered nodes identifying themselves to a line terminal;
  the line terminal detecting a collision between two or more nodes;
  the line terminal notifying one or more of the nodes that a collision occurred; and
  one or more of the undiscovered nodes identifying themselves to the line terminal again after a random wait period.

* * * * *

UNITED STATES PATENT AND TRADEMARK OFFICE
CERTIFICATE OF CORRECTION

PATENT NO. : 7,428,586 B2  Page 1 of 1
APPLICATION NO. : 10/097027
DATED : September 23, 2008
INVENTOR(S) : Sutherland et al.

It is certified that error appears in the above-identified patent and that said Letters Patent is hereby corrected as shown below:

In column 10, line 58, in Claim 7, delete "receipt" and insert -- receipt of --, therefor.

In column 12, line 19, in Claim 15, delete "14" and insert -- 14, --, therefor.

Signed and Sealed this

Thirty-first Day of March, 2009

JOHN DOLL
*Acting Director of the United States Patent and Trademark Office*